United States Patent
Von Radziewsky et al.

(10) Patent No.: US 12,505,676 B2
(45) Date of Patent: Dec. 23, 2025

(54) METHOD AND PROCESSOR CIRCUIT FOR OPERATING AN AUTOMATED DRIVING FUNCTION WITH OBJECT CLASSIFIER IN A MOTOR VEHICLE, AS WELL AS THE MOTOR VEHICLE

(71) Applicant: CARIAD SE, Wolfsburg (DE)

(72) Inventors: Philipp Von Radziewsky, Berlin (DE); Hans-Arne Driescher, Berlin (DE)

(73) Assignee: CARIAD SE, Wolfsburg (DE)

( * ) Notice: Subject to any disclaimer, the term of this patent is extended or adjusted under 35 U.S.C. 154(b) by 544 days.

(21) Appl. No.: 17/877,654

(22) Filed: Jul. 29, 2022

(65) Prior Publication Data
US 2023/0033314 A1 Feb. 2, 2023

(30) Foreign Application Priority Data
Jul. 30, 2021 (DE) .......................... 102021119871.2

(51) Int. Cl.
*G06V 20/58* (2022.01)
*G06T 7/20* (2017.01)

(52) U.S. Cl.
CPC ................ *G06V 20/58* (2022.01); *G06T 7/20* (2013.01); *G06T 2207/30241* (2013.01); *G06T 2207/30261* (2013.01)

(58) Field of Classification Search
CPC ........ G06V 20/58; G06V 10/82; G06V 10/25; G06T 7/20; G06T 2207/30241; G06T 2207/30261
See application file for complete search history.

(56) References Cited

U.S. PATENT DOCUMENTS 11,761,790 B2 * 9/2023 Kolagheichi-Ganjineh ................ G01C 21/3811 382/103
2010/0099353 A1 * 4/2010 Komori ............ G08G 1/096791 455/39

(Continued)

FOREIGN PATENT DOCUMENTS

CN 110962744 A * 4/2020
DE 10 2008 022 856 A1 11/2009
(Continued)

OTHER PUBLICATIONS

J. Hardy and M. Campbell, "Contingency Planning Over Probabilistic Obstacle Predictions for Autonomous Road Vehicles," in IEEE Transactions on Robotics, vol. 29, No. 4, pp. 913-929, Aug. 2013, doi: 10.1109/TRO.2013.2254033. (Year: 2013).*

(Continued)

*Primary Examiner* — Stephen R Koziol
*Assistant Examiner* — Ashley Hytrek
(74) *Attorney, Agent, or Firm* — Seed Intellectual Property Law Group LLP

(57) ABSTRACT

An automated driving function in a motor vehicle comprises: a processor circuit of the motor vehicle recognizes respective individual images of an environment of the motor vehicle from sensor data of a least one sensor of the motor vehicle by means of at least one object classifier. At least one relational classifier using the object data for at least some of the individual objects additionally recognizes a respective pairwise object relation with the aid of predetermined relation features of the individual objects in the respective individual image determined from the sensor data, which relation is described by relational data, and an aggregation module is used to aggregate the relational data throughout (Continued)

multiple consecutive individual images to produce aggregation data, which describe aggregated object relations.

13 Claims, 8 Drawing Sheets

(56) References Cited

U.S. PATENT DOCUMENTS

| | | | | |
|---|---|---|---|---|
| 2018/0132340 | A1* | 5/2018 | Correa | B60Q 1/143 |
| 2018/0341822 | A1* | 11/2018 | Hovis | G06F 18/251 |
| 2021/0179097 | A1* | 6/2021 | Pan | G06V 10/82 |

FOREIGN PATENT DOCUMENTS

| | | |
|---|---|---|
| DE | 10 2016 202 594 A1 | 8/2017 |
| DE | 10 2019 130 947 A1 | 5/2021 |
| DE | 10 2019 217 306 A1 | 5/2021 |

OTHER PUBLICATIONS

Zhang, J., Elhoseiny, M., Cohen, S., Chang, W., & Elgammal, A. (2017). Relationship proposal networks. In Proceedings of the IEEE conference on computer vision and pattern recognition (pp. 5678-5686). (Year: 2017).*

J. Pan et al., "Lane-Attention: Predicting Vehicles' Moving Trajectories by Learning Their Attention Over Lanes, " 2020 IEEE/RSJ International Conference on Intelligent Robots and Systems (IROS), Las Vegas, NV, USA, 2020, pp. 7949-7956, doi: 10.1109/IROS45743.2020.9341233. (Year: 2020).*

B. Chen, Q. Yuan, J. Li, J. Lu and B. Zhu, "Joint Route Planning and Traffic Signal Timing for Connected Vehicles: An Edge Cloud Enabled Multi-Agent Game Method," 2020 International Conference on Space-Air-Ground Computing (SAGC), Beijing, China, 2020, pp. 1-6, doi: 10.1109/SAGC50777.2020.00012. (Year: 2020).*

* cited by examiner

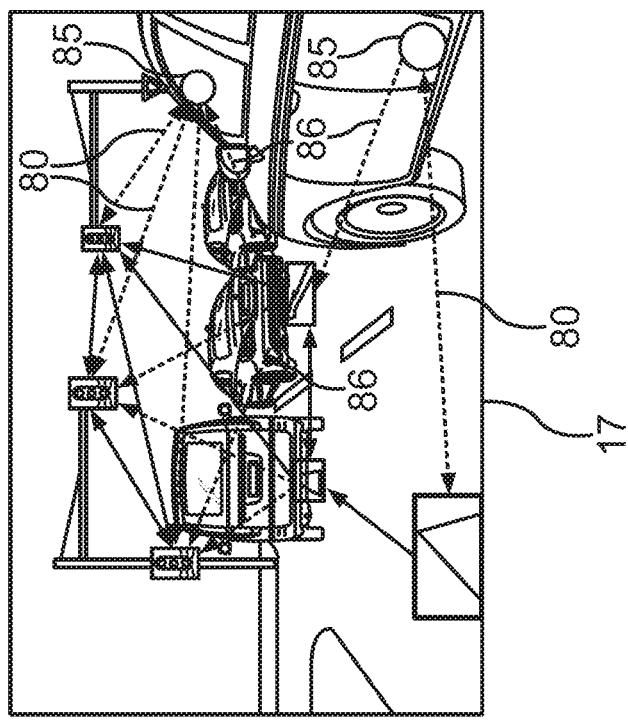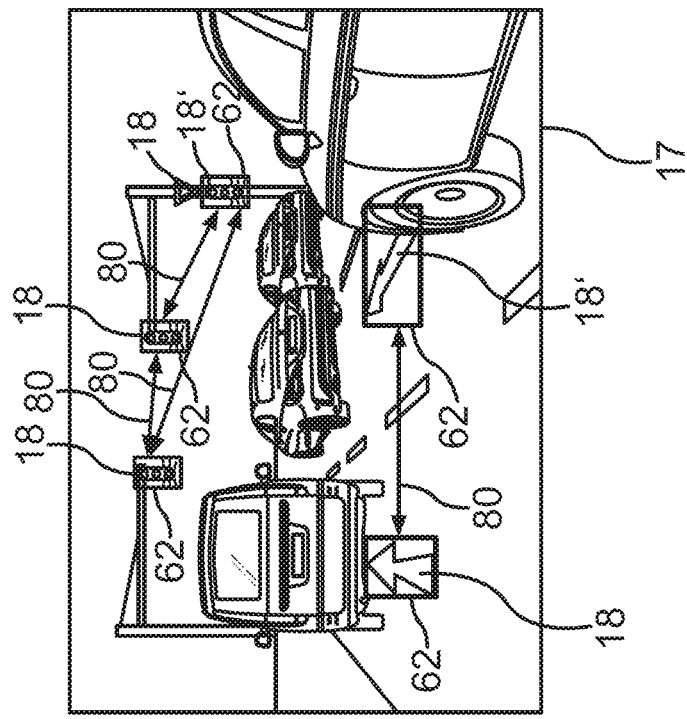
Fig.4

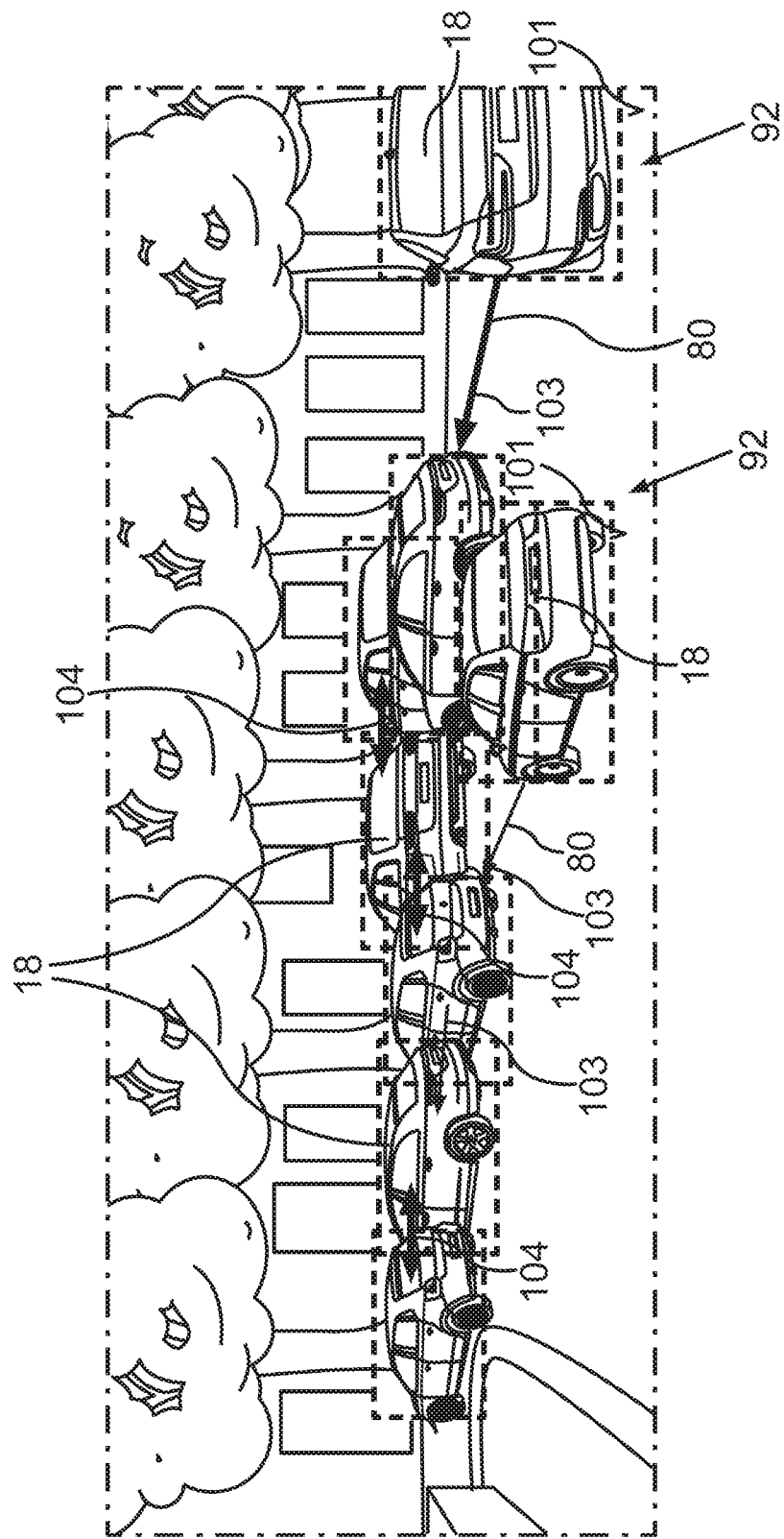

METHOD AND PROCESSOR CIRCUIT FOR OPERATING AN AUTOMATED DRIVING FUNCTION WITH OBJECT CLASSIFIER IN A MOTOR VEHICLE, AS WELL AS THE MOTOR VEHICLE

BACKGROUND

Technical Field

Embodiments of the invention relate to a method for operating an automated driving function in a motor vehicle. Sensor data describing individual images of an environment of the motor vehicle are received by a processor circuit. In the individual images, respective individual objects are recognized by means of at least one object classifier. Embodiments of the invention also relate to the processor circuit and the motor vehicle.

Description of the Related Art

In a motor vehicle with an automated driving function, a detection of objects such as other road users or infrastructure components in the environment of the motor vehicle is necessary in order for the automated driving function to plan in advance a trajectory for the driving of the motor vehicle, for example. In general, a detection of objects is done on the basis of the sensor data of at least one sensor of the motor vehicle, such as a camera and/or a radar and/or a LiDAR. Sensor data are generated in individual measurement cycles, representing a snapshot or an individual image of the environment in the detection region of the particular sensor. Objects can be identified individually in such individual image by means of an object classifier, for example by means of an artificial neural network. Then, for example, each object can be marked by the coordinates of a so-called bounding box (smallest possible rectangle which encloses the object) for a later processing of the sensor data. In this way, object data is available for the later processing as to where each individual object is located in the individual image. Since only individual knowledge is available in this way separately for each individual object, these objects made individually known shall be called here individual objects.

The sensor data recorded by the vehicle is processed in the prior art such that individual objects which are relevant for the automated driving function are found in this sensor data and typical properties such as distance, speed, and class are determined by observation over time (tracking). The interpretation of the totality of these individual objects is done predominantly with the aid of these properties so determined. One obvious necessity for a successful interpretation of object relations is for all required properties to be determined in the necessary quantity and be described in appropriate form for the further processing. Object relations always involve multiple individual objects, e.g., which individual object is situated relative to which other individual object, which individual objects belong to a common installation, e.g., a traffic light system. In complex environments of the vehicle (such as intersections, traffic circles, enclosures, no lane markings), the complete processing of these data involves a large computing expense.

A tracking of individual objects and a gradual deepening of the recognition of object properties is known for example from US 2018/0341822 A1.

For a trajectory planning, however, it is also necessary to know the geometrical and/or functional object relations of individual objects among each other, for example in order to recognize which traffic lane leads to which traffic light, so as to plan in advance whether the motor vehicle is approaching a red light on the current traffic lane.

For this reason, the actual object classification for the detecting of individual objects is generally combined with an environment map, in which the individual objects are presented according to their geographical position, in order to interpret their geometrical relation to each other and thus their belonging together. However, such an environment map is very costly in terms of computing resources and it also requires the inclusion of many individual objects, which are then no longer relevant to the decision made as to which trajectories will be driven. For example, for the recognition of a curve it is also often important to map the course of the roadside structures in order to recognize the curve in the road in an environment map. This requires a needless use of computing resources in the motor vehicle.

BRIEF SUMMARY

Some embodiments make known individual objects which belong together with few computing resources for an automated driving function.

Some embodiments relate to a method for operating an autonomous and/or assisted driving function in a motor vehicle. In the following, the terms "autonomous and/or assisted" are subsumed under "automated". An automated driving function can drive or guide by a trajectory planning and an actuating of actuators for a longitudinal control (acceleration and braking) and/or a transverse control (steering) of the motor vehicle without the involvement of a driver. For this, individual objects present in the environment of the motor vehicle must be detected. An assisted driving function can be realized, for example, by a traffic light assistant. The method involves a processor circuit of the motor vehicle recognizing from sensor data of at least one sensor of the motor vehicle, by means of at least one object classifier, respective individual objects in individual images described by the sensor data (such as camera image, radar image, infrared image, ultrasound image) or point clouds (LiDAR) of an environment of the motor vehicle. The sensor data of an individual image or a point cloud of a measurement cycle of a LiDAR are here subsumed as individual image. The term "individual image" will also include a 3D image, e.g., from a stereo camera. An individual image can also be an internal representation of radar signals.

As a result of the object classification in an individual image, at least one object characteristic recognized by object data (such as a bounding box and/or an object type) of the individual object is indicated and provided to the automated driving function for a trajectory planning. Thus, this already known architecture for a platform for an automated driving function calls for using at least one object classifier, i.e., for example one or more artificial neural networks and/or another method of machine learning) in individual images to recognize individual objects in the individual images, such as other road users, infrastructure components (such as traffic lights and/or traffic signs) and/or lane components (such as arrows and/or lane markings and/or guide strips). Object data are then provided for these individual objects, such as coordinates of a bounding box, indicating in the respective individual image where the particular recognized individual object was localized or recognized. In addition or alternatively, the object type can be indicated, such as whether it involves a traffic sign or a traffic light or a person or a motor vehicle, to mention only some examples. A further classification may also be undertaken, as is also known in the prior art, in order to recognize, e.g., the current state of an object (such as "traffic light is red").

The object data can be provided directly to the driving function or a portion thereof or all object data can be relayed via a tracking module to the driving function. By means of a tracking module, the individual objects can be followed by means of an object tracking over multiple consecutive individual images and the tracking module can determine tracking data of the individual objects being followed or tracked. A tracking module is helpful but not necessary to the described method. Technically speaking, one only needs an association between objects. By means of the tracking module, in addition and in familiar manner it is possible to follow or track the relative motion of the respective individual object with respect to the motor vehicle over multiple individual images. Thus, information is available as to the position of the individual objects separately from each other, which can be utilized by the automated driving function.

As already described above, the use of a situation map or environment map would now be needed in order to recognize an object relation or a connection or relation between such individual objects, i.e., for a scene interpretation, in which map at first it would be necessary to include all recognized individual objects, in order to recognize their relationship to each other. This will be made possible instead by embodiments described herein with few computing resources. For this, there is no use of a situation map or environment map after the tracking, but rather it is already determined (prior to the object tracking) for each individual image what object relation of the individual objects among each other can be detected therein or extracted therefrom.

In order to determine relationships between the individual objects with little demand for computing resources, the recognition of object relations between individual objects relevant for driving functions is done already on the basis of the individual images, based on relation features detected in the individual images, such as a geometrical relation. This is less complex than the recognition of an overall nature of the environment in a situation map, so that benefits also accrue for the required computing time and the volumes of data.

For this, the method involves the use of at least one relational classifier to recognize, with the aid of the object data, a respective pairwise object relation for at least some of the individual objects with the aid of relation features of the individual objects in the respective individual image from the sensor data (also known here as VRC—Visual Relation Classification) and to describe this by relational data, and to use an aggregation module to aggregate the relational data over multiple consecutive individual images and form aggregation data, describing repeatedly observed or aggregated object relations, and the aggregation data are provided to the tracking module and/or to the automated driving function. The object relations are thus determined on the individual image basis. One suitable relation feature is the geometrical relation or relative geometrical arrangement. But in general a predetermined object environment in the individual image or even the entire image content can form the basis for defining relation features. Thus, they are relation features learned from individual images, which can be extracted e.g., by means of a machine learning model. The context of a pixel/object may be comprised by the geometrical position (top of image, bottom of image) and/or by the image context, e.g., from other objects situated in proximity to the object.

This is based on the knowledge that relevant information can already be recognized for the planning of a trajectory simply from the geometrical relation of the individual objects and/or another relation feature in an individual image. For example, the prior knowledge can be used here that two individual objects of the same object type (for example two construction site beacons) on a flat, upcoming road at different distance from the motor vehicle have different size in an individual image and on account of the vanishing perspective they are situated with different y-component (vertical component) when the sensor detects the upcoming environment, e.g., from a roof camera or from a windshield. Thus, for example, the evaluation of the relative arrangement of upper edges of the bounding boxes of individual objects can furnish an idea as to which object is located closer to the motor vehicle and which one is further away in relation to this.

The aggregation module can be used to form a hypothesis or a probability statement or a confidence value over multiple individual images as to how reliable a recognized object relation is (for example, object A is behind object B). The aggregation prevents a wrong recognition in one individual image from leading to a wrong interpretation of the driving situation. The aggregation data describe the aggregated object relations, thus for example for the recognized individual objects the geometrical relation and/or the relation feature with which they stand to each other, for example, object B (a third vehicle) is driving next to object C (the other vehicle).

Thus, an interpretation of sensor data of the environment is provided for the automated driving with the goal of determining the relations of different objects/entities (individual objects) among each other and to the ego vehicle (the motor vehicle which is implementing the method) and being able to group them by logical and spatial criteria. Besides the recognition of these objects/entities in the sensor data, it also makes possible a hypothesis formation of the object relations and groups, which will be explained further below in regard to object groups. By "hypothesis formation" is meant that a hypothesis or probability statement can be determined as to how reliable or confident the statement is with regard to a recognized object relation. For this, the object relations are aggregated or confirmed over multiple individual images, so that in event of repeatedly recognized object relations it can be distinguished whether it involves a recognition mistake or (in the event of multiple confirmed recognitions of the same object relation) an actual observation in the environment. For this, the present method describes one way to form these hypotheses through the recognition of an object relation graph (relational data) from the sensor measurements, taking into account the object environment, and to manage this through the time tracks of the relations.

Embodiments of the invention also include modifications with features yielding additional benefits.

The aggregation data can describe for example a directional relational graph, pointing from one individual object as the subject to another individual object as the object and indicating the type of relation (for example: "behind" or "in front"). Thus, the individual objects can be described by the directional relational graph in regard to their object relations.

One modification involves the aggregation module determining, in dependence on a frequency of repetition and/or quality of recognition of the particular object relation, a weighting value for the particular aggregated object relation and describing this by the aggregation data. If in multiple individual images in succession an object relation is confirmed or repeated, this increases the weighting value, so that a confidence or a reliability of the statement about an object relation in the aggregation data is indicated. This is advantageous in the case of a statistical assessment of a driving situation.

In addition or alternatively, it can be provided that the aggregated object relations which produce a closed relational graph of object relations for several of the individual objects describe these individual objects as a related object group. In particular, in the case of individual objects which are static (such as infrastructure components and/or lane lettering and/or lane markings), fixed or constant object relations or a relational graph may occur in the aggregated object relations, which are observed repeatedly by the motor vehicle when approaching the object group consisting of multiple individual objects or which can be logically inferred. Then, if for each individual object of the object group there is known an object relation to every other individual object of the object group, one gets a closed graph, which can be recognized as being complete in automatic manner by means of an algorithm from graph theory. If such a closed relation graph occurs, this can be signaled and the object group can be recognized or signaled or described for example as being a higher-level structural unit composed of multiple individual objects. Thus, for example, simply on the basis of individual images and without the use of a situation map, a traffic light group or an intersection with feeding traffic lanes, lane arrows, lane markings and/or traffic lights can be detected as a closed relation graph and described as an object group. A closed graph can also be formed or derived from multiple individual images in succession. Furthermore, each time a portion of the closed graph can be recognized in different individual images. A combining to form a closed logical graph through the logical relations (such as A->B and B->C, hence A->C) is likewise possible.

One modification involves respective individual images being received from multiple sensors and for each sensor a special relational classifier operates and the aggregation module performs a relational data fusion for relational data of the multiple relational classifiers. In other words, the recognition of object relations is done individually or separately for each sensor and its sensor data. In this way, for example, it is possible to integrate such a relational classifier into a data processing circuit of a sensor, i.e., into the respective controller of the sensor. The relational data fusion, i.e., the merging and/or plausibilizing of recognized individual relations or object relations in the individual images of the individual sensors can then be performed by the aggregation module. On the whole, therefore, the respective relational classifier can be implemented with less expense, since it only needs to be adapted to the sensor data of a single sensor. The aggregation in the aggregation module and thus also the relational data fusion can then be added on, regardless of the sensor type, and thus also in an easily realized form.

One modification involves the object classifier using the object data as respective object characteristics to indicate a bounding box and/or an object type. It should be noted that the individual images may rely on visible light when a camera is used as the sensor. In addition or alternatively, however, an individual image may also rely on a different measurement principle and then it may be, as already noted, a radar image or an ultrasound image of a lidar image, to name only a few examples. A bounding box can be defined two-dimensionally or three-dimensionally, according to the resulting sensor coordinate system, for example as a rectangle or a cuboid. The object type which is recognized can be established by the choice of the object classifier. One may use an object classifier of the prior art. A distinction can be drawn between road users on the one hand and stationary objects on the other hand. The other familiar classifications (distinguishing between vehicle, pedestrian, bicycle, traffic light, traffic sign, lane marking, roadway pavement, arrows on the roadway) can also be carried out by an object classifier. A bounding box can be defined by coordinates of two or three corners, in the case of a two-dimensional bounding box, for example the upper left and lower right corner.

One modification involves the aggregation data being used in the tracking module to perform an object tracking of an individual object hidden in at least one individual image of multiple consecutive individual images. Thus, the aggregation data of the aggregated object relations are used already during the object tracking, so that even when following hidden individual objects which are temporarily hidden in one or more consecutive individual images and thus no longer recognizable in comparison to previous individual images (for example because they are situated behind a truck) a statement can still be made as to their whereabouts or their absence, without having to make an entry in an environment map. Thus, a hidden individual object can also be tracked without an environment map. For this, for example, one can use an object relation which states that the hidden individual object is "next to" an individual object still visible in the current individual image. In addition or alternatively, the relational data in the aggregation module can be formed by means of tracking data from the tracking module over multiple consecutive individual images, in that a hidden individual object is identified by the tracking module.

One modification involves the relational classifier signaling, as a pairwise object relation, a relative arrangement of the particular individual objects by means of a directional relation statement, especially adjacent, consecutive, predecessor, successor, and/or a nondirectional relation statement. The description of an object relation requires less memory, in particular, fewer than 1000 Bytes are sufficient, since only a direction of the object relation (subject to object) and/or a relation type (such as "next to" or "behind") needs to be indicated. As already described, it has been discovered that such directional relation statements can already be recognized, e.g., from the geometrical relation or relative arrangement of the individual objects in an individual image. By "directional" is meant here that there is one individual object as the subject and another individual object as the object, so that the statement can be made, for example: "individual object A is the predecessor of individual object B" in a serial arrangement of individual objects. In the manner described, an indicator of an object relation can already be made from an individual image, for example from the relative arrangement, because for example one individual object is higher or situated with a larger y-coordinate than another individual object, and/or a size ratio of the bounding boxes. An individual object of a given object type (such as a vehicle) which is further away has a smaller bounding box than an individual object of the same object type which is closer to the motor vehicle. It can also be recognized by an evaluation of coordinates of the bounding boxes whether two individual objects are situated in a pairwise object relation alongside each other. By "predecessor" and "successor" is meant that that a motor vehicle along a direction of travel will at first reach the predecessor and then the successor. The indicated relation statements or relation types have the advantage of making possible already an inference as to the driving situation by classifying of individual objects and these object relations, for example, the recognition of a construction site barricade, because similar individual objects in the form of signal signs or beacons are recognized and each time the object relation "is the successor of" is recognized, so that a series of consecutive individual objects with a signaling nature is recognized and this can then be recognized as a temporary road limitation in the region of the construction site, for example. This can be recognized already with the aid of one individual image or by aggregated object relations composed of multiple consecutively received individual images, without needing to form an environment map for this. A nondirectional relation statement can indicate, e.g.: "A belongs to the same access road as B". A special advantage of the indicated method is its involvement of the object environment even to including all of the individual image in the relation recognition, so that even cases which are not distinctly deducible from the geometrical relations can be correctly associated. One example of this is the including of lane arrows in tight curves.

One modification accordingly involves the relational classifier performing the recognition of the particular object relation independently of a following included environment map of the driving function and/or without information about planned trajectories of the automated driving function. Hence, in the manner described, there is no use of an environment map and therefore no forming or generating of an environment map is needed in order to carry out the method. Neither is it necessary to know what trajectory the automated driving function is planning, that is, no feedback or so-called top-down signaling of the calculation result of a trajectory planning is needed for the evaluation of the individual images according to the method. Instead, the aggregation data of the aggregated object relations can be generated for all recognized or all potentially passable routes. Hence, the information or aggregation data is then available in the automated driving function for all potentially selectable trajectories.

One modification involves the driving function comprising a situation recognition for at least one driving situation and the respective driving situation is described as a combination of individual objects and their aggregated object relations.

As already mentioned, it is possible for example to form object groups in order to identify a driving situation, such as an intersection with a traffic light system. Which individual objects and their aggregated object relations refer to which driving situation can be determined or dictated, for example, by a machine learning method, for example, with the aid of an artificial neural network, using training data. Such training data can be aggregation data and object data, on the one hand, and so-called labeling data dictated manually by an operator, indicating the correctly recognized driving situation. Thus, it is possible with the aid of object data and aggregation data to recognize once again an intersection type, for example an intersection with additional right-turn exit lane. It is possible to take into account here the particular object type of the recognized individual objects (such as object type: traffic light, lane exit arrow, stop line) and the aggregated object relation of the individual objects.

A driving situation can be recognized once again, e.g., by comparing the object data and the aggregation data against given pattern data of relation patterns of known driving situations and recognizing a matching which his greater than a predetermined minimum value.

One modification involves the driving situation detected being an approaching of an intersection, wherein the aggregated object relations between stationary infrastructure objects, especially lane boundaries and/or lane arrows, and/or the aggregated object relations between infrastructure objects and vehicles and/or the aggregated object relations between vehicles are respectively combined to form route hypotheses in regard to available routes. Possible routes are coordinated with groups of traffic lights through a relation recognition from aggregated object relations between the traffic lights and the individual objects describing a particular route. As already stated, by a "hypothesis" is meant a statement with additionally provided probability value or confidence value as to the correctness or reliability of the statement. For this, one may use the already described weighting value, which can be utilized or used as the probability statement or confidence value. A route can be associated with a traffic light group, for example, by recognizing the route as a sequence of arrows on the roadway with the object relation "is a successor of" as a series or sequence of arrows, and having a stop line at the end of the last arrows as "successor," and above the stop line the traffic light group. In addition or alternatively, a route can also be recognized, for example, in the absence of a route marking with the aid of a series or chain of successively moving road users, which are recognized as individual objects together with the object type ("road users" or "motor vehicle") and having as the object relations ("is a successor of"). Thus, the approach to an intersection can also be described with low data expense, since only the object data to describe the individual objects and the aggregation data to describe the pairwise object relations and/or group data to describe object groups are needed.

One modification involves the object data of the individual objects also describing their recognized object attributes and/or states, especially the spatial orientation and predetermined light signals, which are taken into account in the recognizing of the driving situation. These states for individual objects have proven to be especially informative in recognizing or again recognizing a driving situation. The directional statements can be indicated in relation to a route or a celestial direction. Predetermined light signals can be, for example: an activated brake light, a directional indicator (left blinker, right blinker), a warning signal of an ambulance. The states differ from object attributes in that they are variable over time, i.e., a changing of state is possible. An object type, on the other hand, such as the object type: motor vehicle, does not change for an individual object. Object attributes are also constant equipment features of an individual object, such as whether a traffic light has the three colors red, yellow, and green, or only the colors yellow and green. A spatial orientation as an object attribute can indicate, for example, the direction in which a traffic light or a traffic sign is pointing. The hypothesis as to whether and/or when travel is allowed on a recognized route with possible target direction ("green light") may be relegated to an object tracking, in order to aggregate time information as to the traffic light states.

One modification involves a driving situation which is detected as being a route with no road marking, wherein the individual objects detected are vehicles traveling on the route in a consecutive series one after the other, and the aggregated object relations are used to recognize the series of consecutively traveling vehicles and the geometrical trend of the series is signaled as the route. Thus, the route is recognized by a series of road users in the form of vehicles moving one behind another. Two adjacent series then represent a two-lane route.

One modification involves a driving situation which is detected being a road boundary formed from discrete, similar individual objects, especially in a construction site and/or on a country road (e.g., heavily dirt or snow covered roadways), wherein the trend of the boundary is determined through the aggregated object relations of the individual objects, especially with the aid of an aggregated object relation indicating that the particular individual object is located behind a particular predecessor object. The road boundary is thus recognized independently of the markings recognizable on the road, with the aid of individual objects standing in particular upright, such as bollards or boats or marking tapes or trees of an avenue. By means of multiple individual objects of the same type, it is possible to detect or interpret the barrier as successively arranged individual objects of this object type, as described. This approach using object relations offers the advantage of working for very short road sections, therefore observable only for a limited period of time.

One modification has the automated driving function comprising an object recognition for at least one predetermined environment object, such as a vehicle, and the particular environment object is described as a combination of individual components and their aggregated object relations. This has proven to be an especially flexible implementation of an object recognition. Thus, for example, at first, individual components such as headlights and/or tires and/or license plate and/or mirrors can be recognized by the object classification and then the recognition of a vehicle as an environment object can take place through the object relations (for example, two headlights next to each other and a license plate in between). It is thus also possible to recognize a vehicle having a form otherwise atypical of a motor vehicle, such as a carnival moving van. The recognition of the environment object can then be limited by the object classifier to the required standard individual components, such as headlights and/or license plate, and/or to technically necessary individual components, such as tires, and the actual identification as a vehicle can be done with the aid of the object relations. Thus, the object classifier only needs to recognize the individual components as individual objects and the actual recognition of the environment object is then done with the aid of the object relations. This also makes it possible to detect or recognize environment objects for which the object classification itself was not explicitly or specially trained.

One modification is that, by the motor vehicle and by at least one further motor vehicle for the generating and/or the updating of a digital road map, the respective motor vehicle by means of its own processor circuit uses a method as described herein to determine aggregation data of aggregated object relations and sends the aggregation data to a vehicle-external server by means of a predetermined communication method (such as a Car2X communication method and/or mobile radio and/or WiFi) and the server determines a confidence value of the aggregated object relations, which is dependent on how many motor vehicles have respectively reported the object relation, and if the confidence value of a particular object relation is greater than a predefined threshold value, the particular object relation is entered into the digital road map. Thus, a digital road map can be supplemented with aggregation data, so that a repeated recognition of a given, so-called Point of Interest (POI) or a locality is made possible on the basis of aggregation data. For this, each motor vehicle only needs to drive past the respective point of the locality one time, since the confidence value can be created on the basis of aggregation data of multiple motor vehicles. The digital road map with the aggregation data or a digital relation model in which the aggregation data are represented condensed and/or abstracted can then be sent out to motor vehicles, which can then compare their own aggregation data against the digital road map in order to again recognize the particular location.

The road map and the object relations stored in it can also be used in a motor vehicle for an initialization of the aggregation module, in that initial object relations already present in the road map are read out and aggregated with further sensor data of the motor vehicle by its processor circuit in the described manner. Thus, the procedure is reversed here: the map is considered to be a kind of sensor and the object relations already contained there are read out and aggregated with the "fresh" or new sensor data. Hidden areas for example can be better resolved in this way. On the road map, which may have been downloaded from the server for example, the characteristic or initial object relations are given. With the aid of a current geoposition of the motor vehicle, map data of the object relations present in the current environment can then be read out for the initialization. For example, supplementation from the map can be done in event of construction work and corresponding limited views.

As a further solution, some embodiments relate to a processor circuit for a motor vehicle, wherein the processor circuit is adapted to carrying out an embodiment of the method described herein. The processor circuit constitutes a data processing device or a processor device and it is adapted to carry out an embodiment of the method as described herein. For this, the processor circuit can have at least one microprocessor and/or at least one microcontroller and/or at least one FPGA (Field Programmable Gate Array) and/or at least one DSP (Digital Signal Processor). Furthermore, the processor circuit may contain program code which is adapted to carry out the embodiment of the method described herein when executed by the processor circuit. The program code can be stored in a data storage of the processor circuit.

As a further solution, some embodiments relate to a motor vehicle having an embodiment of the processor circuit described herein. The motor vehicle described herein may be outfitted as an automobile, especially a passenger car or a truck, or as a passenger bus or motorcycle.

Some embodiments also encompass the combinations of the features of the described embodiments. Some embodiments thus also encompass realizations having each time a combination of the features of several of the described embodiments, as long as the embodiments are not described as being mutually exclusive.

BRIEF DESCRIPTION OF THE SEVERAL VIEWS OF THE DRAWINGS

FIG. 4 shows two sketches to illustrate an object tracking, which is stabilized or supported by means of aggregation data of aggregated object relations.

FIG. 8 shows a sketch to illustrate a driving situation recognition in which series of consecutively moving motor vehicles are used as route hypotheses.

DETAILED DESCRIPTION

In the embodiments described herein, the components described each represent individual features to be viewed independently of each other, which may also develop additional embodiments further independently of each other. Therefore the disclosure should also encompass other than the represented combinations of features of the embodiments. Furthermore, the embodiments described can also be supplemented with other of the features already described.

In the figures, elements having the same or similar function may be given the same reference numbers.

Figure 1:
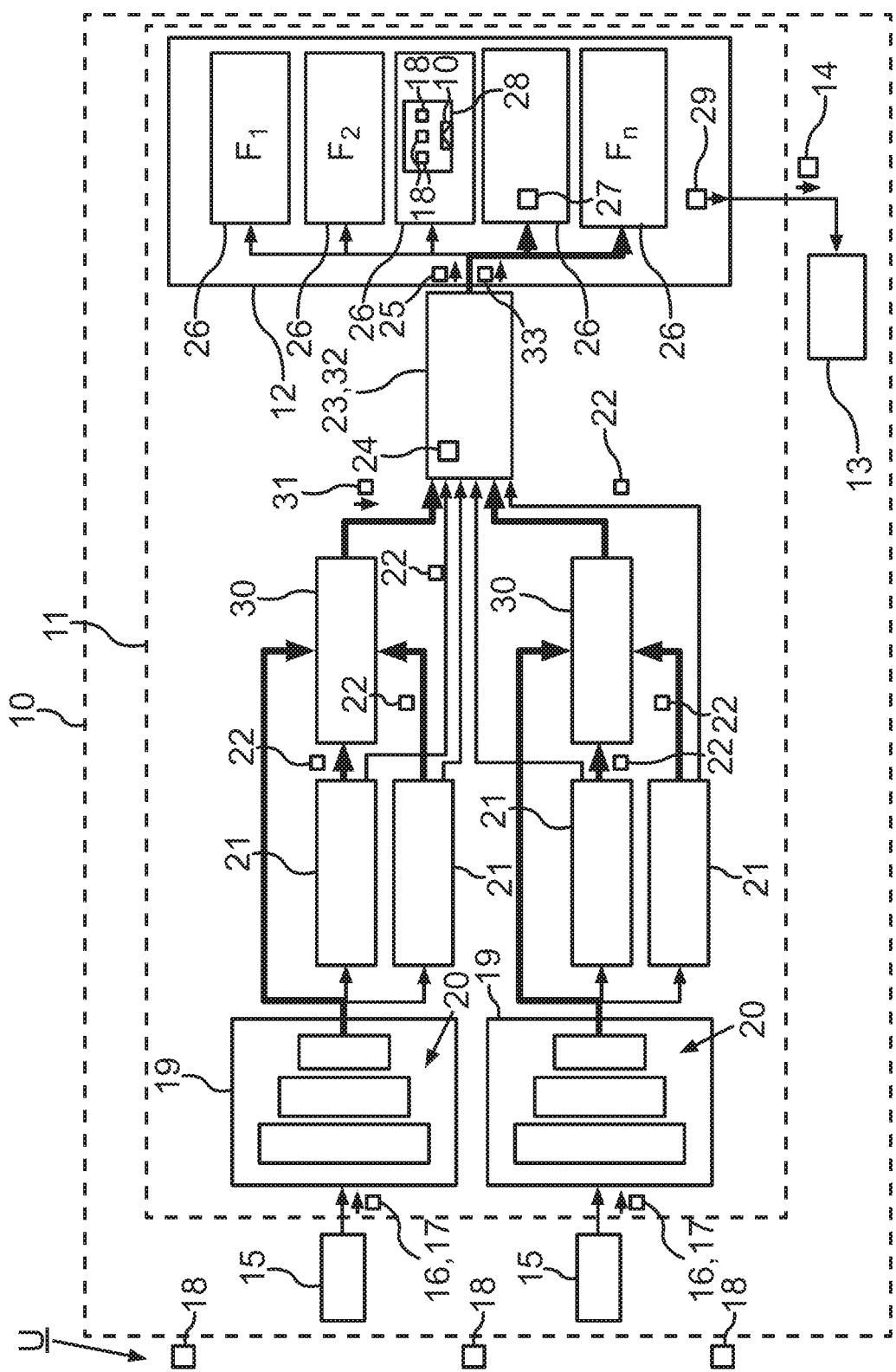
FIG. 1 shows a schematic representation of one embodiment of a motor vehicle with a processor circuit, which can carry out a method as described herein.

FIG. 1 shows a motor vehicle 10, which may be an automobile, especially a passenger car or a truck. In the motor vehicle 10, a processor circuit 11 may be provided, which can be formed for example on the basis of a controller or a grouping of multiple controllers interconnected through a communication network. By means of the processor circuit 11, an automated driving function 12 can be realized for the motor vehicle 10. On the basis of the automated driving function 12, actuators 13 can be actuated by means of control commands 14, in order to carry out a longitudinal control (acceleration and braking) and/or a transverse control (steering) of the motor vehicle 10 automatically without the involvement of a passenger of the motor vehicle 10. For this, the automated driving function 12 can generate control commands 14 for the actuators 13 in familiar manner.

The automated driving function 12 can receive signals from the environment U by means of at least one sensor 15 for a detection of objects in an environment U. Examples of sensors 15 are: a camera for visible light, an infrared camera, a radar, a lidar, an ultrasound sensor, to mention only a few examples. The sensors 15 can each generate sensor data 16, which can be received by the processor circuit 11. The sensor data 16 can be generated in succession in individual measurement cycles, so that the sensor data 16 is always updated. Sensor data 16 of one measurement cycle then produce an individual image 17 of the environment U each time, i.e., a color image or a black and white image or a radar image or a lidar image or an image of ultrasound reflections, to mention only a few examples. In known manner, the processor circuit 11 can perform an object detection of individual objects 18 in the environment U in the way described hereafter, which is also known from the prior art. A feature extraction 19 can be implemented, which can be implemented separately or individually for example on the basis of an artificial neural network 20 for each sensor 15. The artificial neural network 20 is represented here by symbolic feature matrices of the feature extraction 19. On the basis of the feature extraction 19, image features such as edge lines and/or depth information and/or segmented surfaces which fulfill a homogeneity criterion (for example, uniform color or the same pattern) can be detected and made known in the individual images 17. On the basis of the individual images 17 and/or the feature extraction 19, one or more object classifiers 21 can perform an object detection for the detecting of the individual objects 18 for individual sub-regions in the individual images 17. Such an object classifier 21 can be implemented in known manner on the basis of an algorithm for machine learning, in particular an artificial neural network. The object detection of the object classifiers 21 can result in object data 22, which indicate where and which individual object 18 has been detected in the respective individual image 17. On the basis of the object data 22 of the object classifiers 21, a tracking module 23 can perform an object tracking 24, which follows or tracks the position of the individual objects 18 over multiple individual images 17, that is, over multiple measurement cycles. This can be done individually for each sensor 15 or in combination with a sensor function the object data 22 of multiple sensors 15 can be combined and the tracking of the individual objects 18 can be done by the tracking module 23 in a combined object tracking 24. Corresponding tracking modules 23 are known in the prior art. The tracking can result in tracking data 25, which can be provided to the automated driving function 12 for the driving task (longitudinal control and/or transverse control), that is, for generating the control commands 14. The automated driving function 12 may comprise multiple sub-functions 26, indicated here for example as sub-functions F1, F2, ..., Fn. One sub-function 26 may be the recognition of an approach to a traffic light 27 or the recognition of a construction site barrier, as will be further explained in the following.

Another sub-function 26 may be the generating of an environment map or situation map 28, in which the position of the detected individual objects 18 can be mapped on the basis of the tracking data 25 in the situation map 28 relative to the motor vehicle 10 (in the situation map 28 the front of the vehicle is represented symbolically from a bird's eye view). On the basis of such a situation map 28, another sub-function 26 can be a trajectory planning, for example, to plan a driving trajectory 29 by which or through which the control commands 14 can then be generated.

In this signal flow for the automated driving function 12, one relational classifier 30 can be implemented for example individually for each sensor 15, not depending on either the situation map 28 or the planned driving trajectory 29. The relational classifier 30 can work on the sensor data 16 and/or the object data 22 for the individual images 17 or process them. A respective relational classifier 30 can be implemented on the basis of an algorithm for machine learning, for example an artificial neural network, and/or on the basis of an algorithmic evaluation of geometrical relations. The person skilled in the art can determine a suitable geometrical criterion with the aid of individual images from test drives.

With the relational classifier 30, relational data 31 can be generated or signaled regarding the individual images 17 for the individual objects 18, describing the object relations of the detected individual objects 18 in the individual images 17. The tracking module shown in FIG. 1 can also be designed additionally as an aggregation module 32, which generates aggregation data 33 on the basis of the relational data 31, describing aggregated object relations for the object relations of the individual objects 18 classified as being continuous or confirmed or reliably recognized over multiple individual images 17. The aggregation module 32 can also be implemented, for example, as a separate software module. It can be implemented on the basis of an algorithm for object tracking and/or an algorithm for statistical analysis. For example, it can be implemented as a moving average and/or a ML model (ML=Machine Learning). ML models are especially suitable for the processing of sequences. Useful here are recurrent nets and/or models with highlighting mechanisms. With the aggregated object relations which can be signaled in the aggregation data 33, it can be determined that a particular individual object 18 is situated or located, or stops next to another individual object 18.

The generation of the relational data 31 and the aggregation data 33 is explained in the following with the aid of FIG. 2 and FIG. 3. The use of the aggregation data 33 is explained in the following with the aid of FIG. 4 to FIG. 8.

Figure 2:
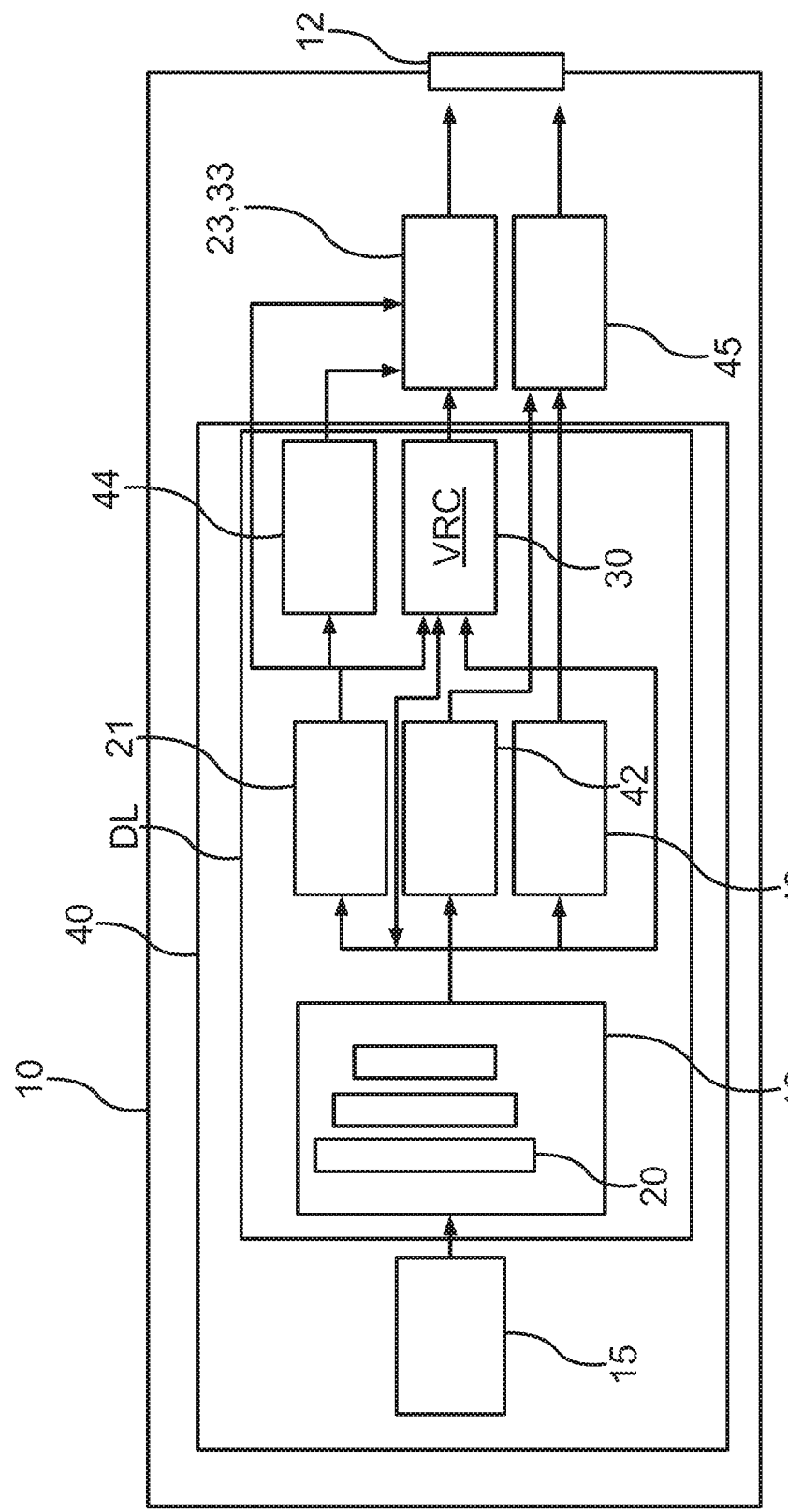
FIG. 2 shows a signal flow chart to illustrate one embodiment of a method in which individual images of an individual sensor are analyzed individually in regard to object relations.

FIG. 2 shows, for an individual sensor 15, how its raw data or sensor data 16 can be processed in the context of a single camera processing 40 for example by means of a so-called deep-learning model of an algorithm for machine learning. It is shown how a feature extraction 19 for example on the basis of the artificial neural network 20 can perform the object detection through the object classifier 21 and in addition for example how a semantic segmentation 42 and/or a further detection 43 can be performed. In known manner, further properties of a detected individual object 18 can be determined for the individual objects by an attribute classifier 44, such as is implemented in the document cited above. In such a single camera processing 40, for example, the relational classifier 30 can also be trained as part of the deep-learning model DL, also being called here a VRC (Visual Relationship Classification), since it is based on the geometrical relations recognizable in the individual images and/or generally on at least one relation feature of the individual objects, that is, the relative position or relative location of the individual objects 18 recognizable in the sensor coordinate system of the particular sensor 15. The generated relational data or (if the aggregation module 32 is implemented as part of the VRC) the aggregation data can then be merged with the information from other sensors 15 for example by the tracking module 23 and/or a tracking over individual images 17 can be performed. Further modules 45 can also be implemented in the signal flow, such as is known for automated driving functions 12.

Figure 3:
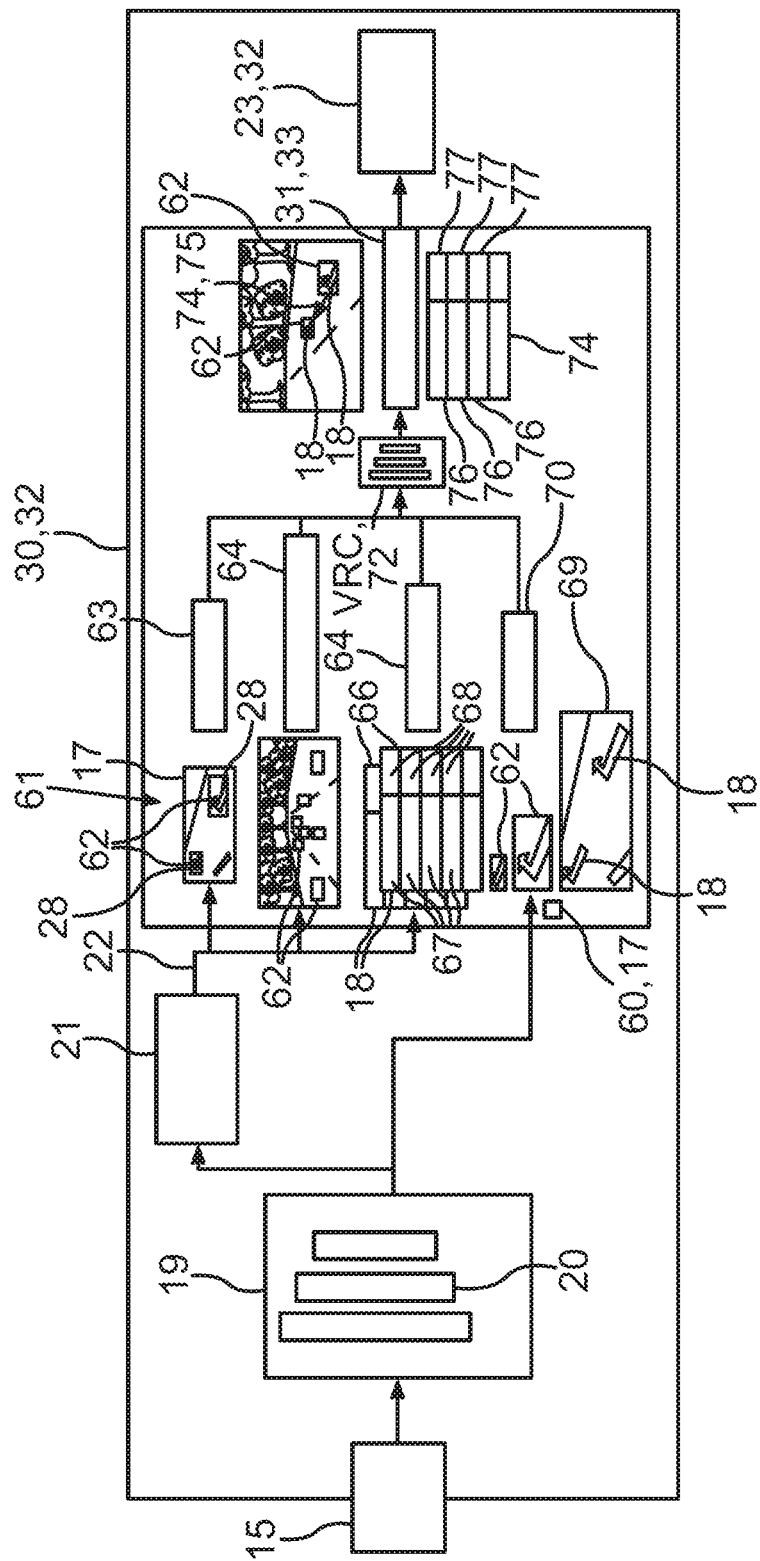
FIG. 3 shows a signal flow chart to illustrate an implementation of a relational classifier.

FIG. 3 illustrates how the relational classifier 30 and/or the aggregation module 32, i.e., the VRC, can be implemented. It is shown, in further detail than FIG. 2, how image data 60 of the individual images 17 in the feature extraction 19 can be provided in addition to the object data 22 for the relational classifier 30. For the relational classifier 30, it is shown which input signals or input data 61 can be used, for example. On the one hand, bounding boxes 62 can be contained in the object data 22 for the current individual image 17, indicating where the particular recognized individual object 18 is situated in the individual image 17. Based on this, an interpretation or evaluation, e.g., of the spatial or geometrical relation can be implemented as a spatial feature extraction 63 (extraction of the spatial object relation (e.g., "next to," "behind"), for example, by a geometrical analysis or a geometrical comparison of the bounding boxes 62 with each other. On the basis of the bounding boxes 62, for example, a spatial feature extraction 63 can determine which geometrical patterns or which geometrical grouping the bounding boxes 62 exhibit among themselves. A semantic feature extraction 65 can be determined on the basis of object attributes 66 of the individual recognized individual objects 18. As the object attribute 66, for example, there can be assigned to each possible or recognizable object type 67 a recognition value or probability or hypothesis value 68, indicating the probability with which the individual object 18 corresponds to the respective object type 67 (for example, traffic light: 0.01, traffic sign: 0.09, vehicle: 0.8, traffic light: 0.1 . . . ). By means of the image data 60, the segment of the individual image 17 described by the respective bounding box 62 can also be represented or indicated. By joining together bounding boxes, a combined bounding box 69 can be formed, encompassing for example two or more bounding boxes 62, in order to also evaluate or interpret the image context or the pictorial relationship of two individual objects 18. A combined bounding box 69 can be achieved, for example, by the extreme values of the multiple bounding boxes 62 (coordinates of the upper left corner and coordinates of the lower right corner, each of them having the smallest or largest value, to mention only one example of such a calculation).

The object types 67 (such as object type "traffic light") and the object attributes 66 (such as "traffic light facing south") and object states (such as "traffic light is now red") constitute the described object characteristics.

The visual feature extraction 70 from the image data 60 and the spatial feature extraction 63, the context feature extraction 64 and/or the semantic feature extraction 65 can be used as input data for an artificial neural network 72, which carries out the actual function of the relational classifier VRC or the relational classifier 30. In this artificial neural network 72, the aggregation module 32 can also be realized. In place of or in addition to an artificial neural network, another algorithm of machine learning and/or a procedural program for the evaluation can be provided. The output data provided can then be the relational data 31 or the aggregation data 33, which can indicate for example pairwise object relations 74 between every two individual objects 18, being represented here as a directional graph 75, pointing from an individual object 18 (represented by its bounding box 62) as the subject to another individual object 18 (represented by its bounding box 62) as the object. The object relation 74 can be described by hypothesis values or probability values, which can indicate each time hypothesis values or probability values 77 of the classification result or recognition result for the possible relation types 76 (for example, "next to," "direct neighbor," "predecessor," "successor"). In the described manner, the relational data 31 or the aggregation data 33 can then be passed on to the tracking module 23 and/or (if the aggregation module 32 is connected to it) to the aggregation module 32.

FIG. 4 illustrates how, for example, the object tracking over two individual images 17 can monitor the presence and/or position of individual images or frames F(n−1) and F(n) for two individual objects 18, even when they are hidden in the individual image F(n), and thereby achieve a support through the aggregation data 33. The designation F here stands for frame, or individual image. The designation n−1 and n indicates that, in the sequence of the individual images 17, the current measurement cycle n is preceded by the immediately prior measurement cycle n−1. It is shown how aggregated object relations 80 between individual objects 18 (such as traffic lights and/or lane arrows) can be determined by the aggregation data 33. The aggregated object relations 80 can indicate, for example, the geometrical relation in which they are arranged (for example, next to each other or closest neighbor or next to closest neighbor). Furthermore, it is illustrated that the bounding boxes 62 signal through the object data where in the particular individual image the individual object is situated. As compared to the individual image F(n−1) and in the individual image F(n) it is shown how an individual object 18' due to concealment 85 by other road users for example in the individual image F(n) is not visible, but thanks to the aggregated object relations 80 its presence can nevertheless be assumed in the individual image F(n). It is even possible to form or compute additional object relations 86 for the hidden individual objects 18' during the concealment 85.

Figure 5:
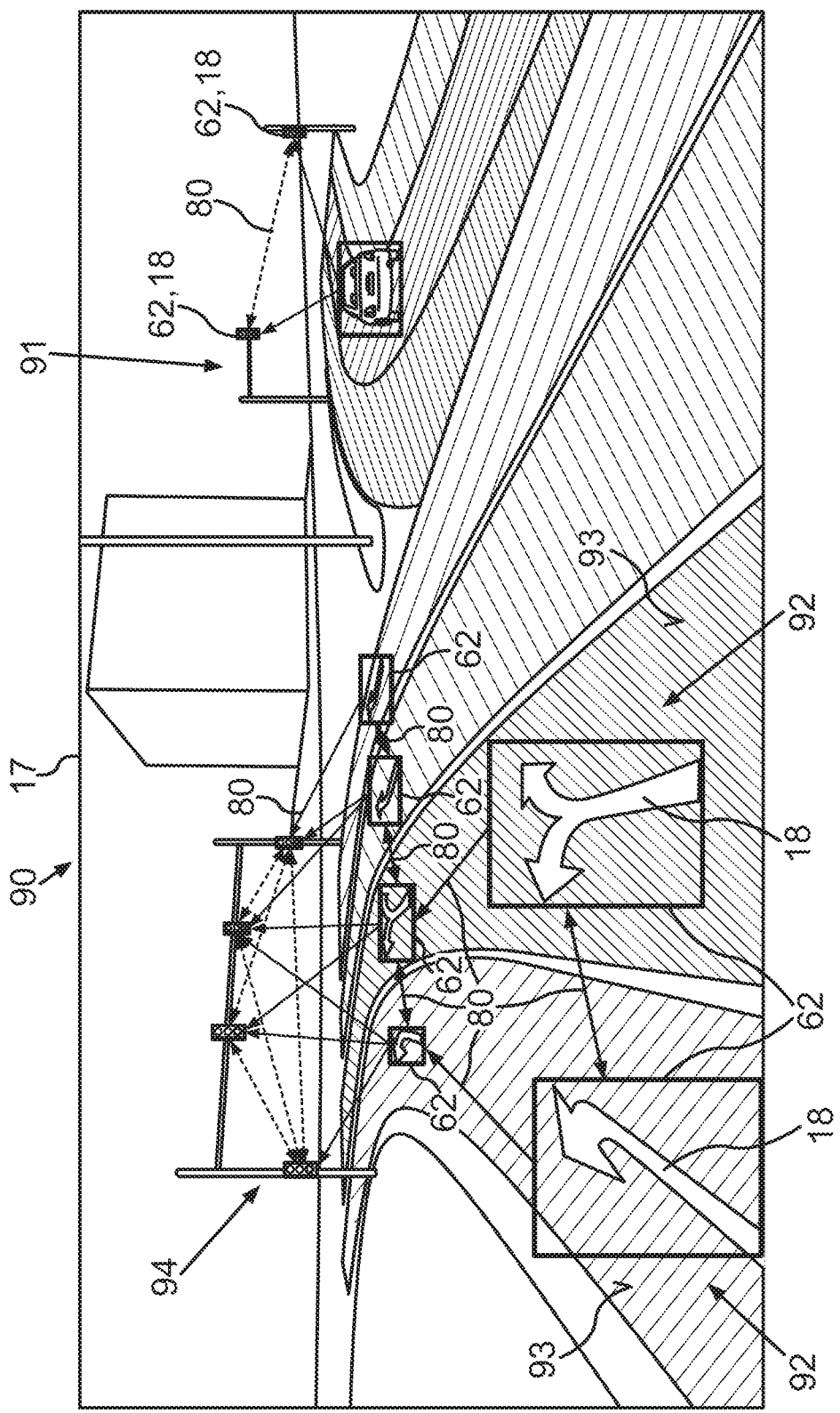
FIG. 5 shows a sketch to illustrate a driving situation recognition for an approach to an intersection.

FIG. 5 illustrates how in the automated driving function a driving situation recognition 90 can be performed in an individual image 17 by a sub-function 26. The driving situation recognized here can be an approach to an intersection 91. By the bounding boxes of individual objects 18 and the aggregated object relations 80 determined for these individual objects 18 (such as "is a successor of," "is last in the series of the same object types," "is beneath"), a concatenation or series 92 of individual objects can be recognized, through which the trend of a traffic lane 93 can be recognized and its belonging to a traffic light system 94 for the traffic lanes 93 on the basis of an individual image 17, especially without the use of a situation map 28. It should be noted that the terms "traffic lane" and "road" are used here as synonyms and equivalents.

Figure 6:
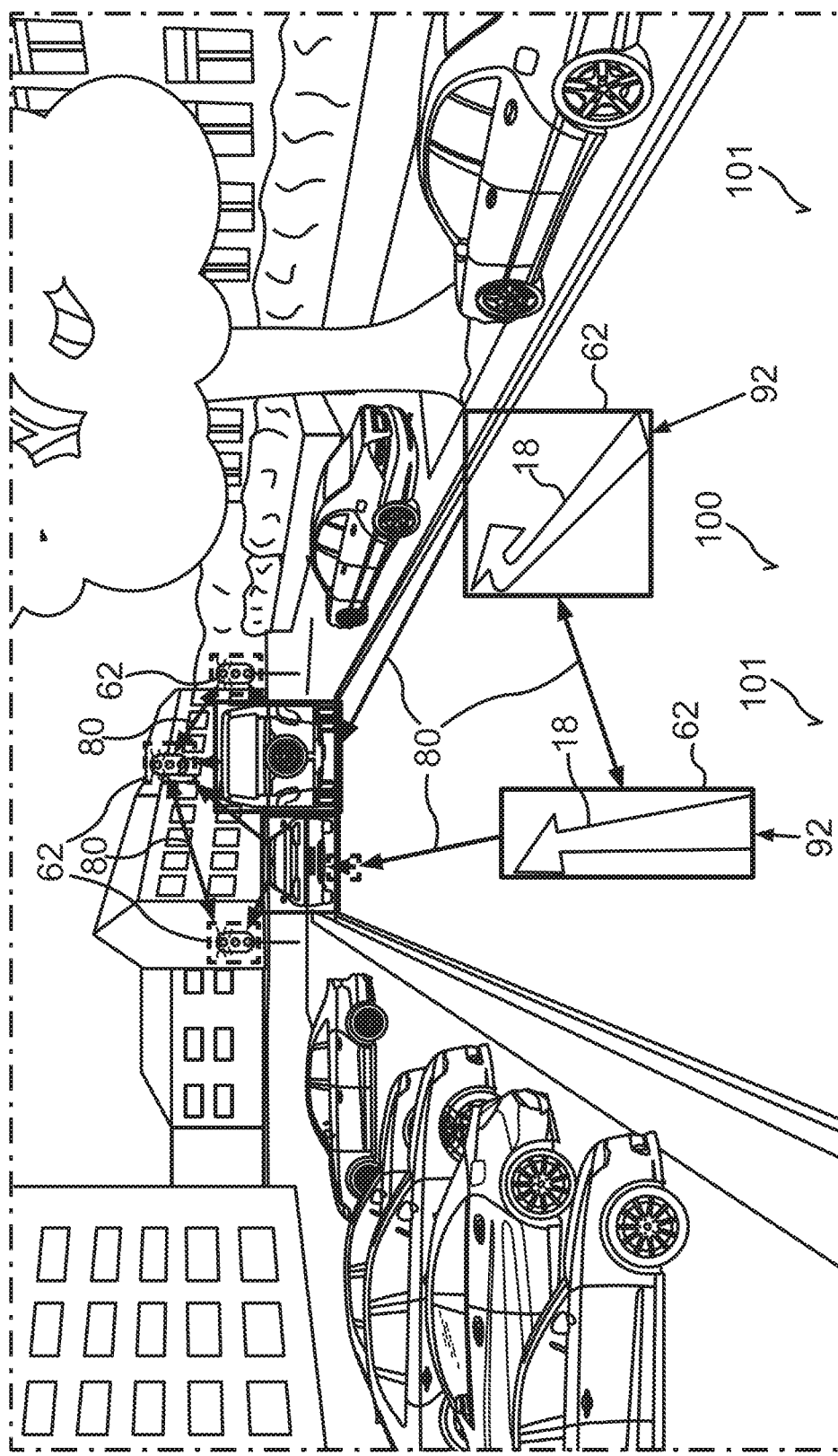
FIG. 6 shows a sketch to illustrate a driving situation recognition for the recognition of traffic lanes in the absence of a lane marking.

FIG. 6 illustrates how, when there is no lane marking 100, it is possible to recognize, on the basis of a respective series 92 of individual objects 18 (marked by a respective bounding box 62 by the object data) and aggregated object relations 80 (such as the object relation type "is the successor of," "is the immediate neighbor of"), that two traffic lanes or roads 101 run alongside each other. A belonging of the roads 101 to a particular traffic light can also be recognized on the basis of the geometrical relationship, as signaled by the aggregated object relations 80 within the series 92.

Figure 7:
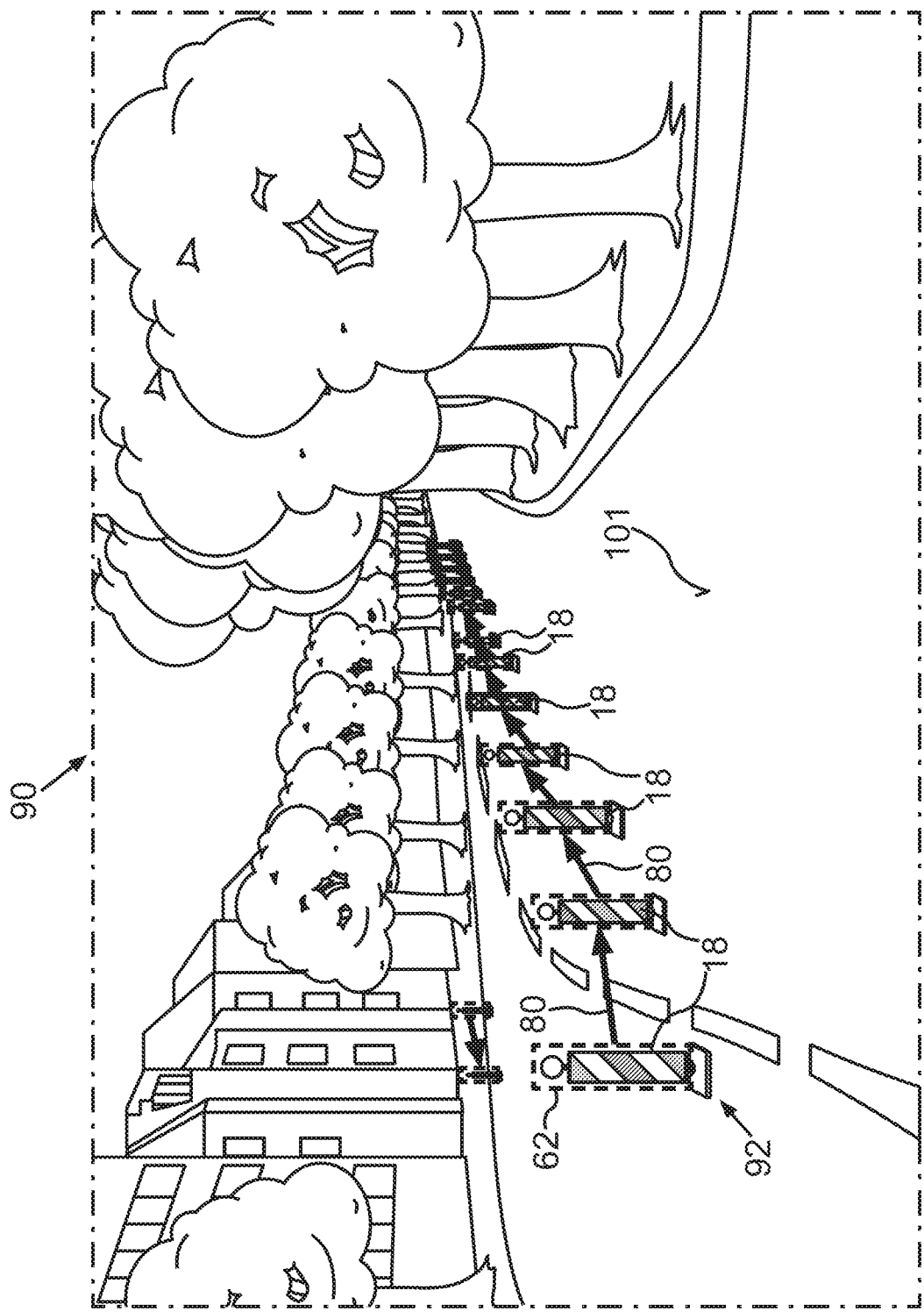
FIG. 7 shows a sketch to illustrate a driving situation recognition for a construction site barrier with change of traffic lanes.

FIG. 7 illustrates how, for individual objects 18 of a similar object type such as a construction site beacon or construction site barrier, a series 92 of similar individual objects 18 in the form of construction site beacons for example can be recognized by aggregated object relations 80 such as those of the type "is the successor of" and how they can be interpreted, based on the aggregated object relations 80, as a barrier of a traffic lane or a road 101 or utilized during the trajectory planning. This can then be signaled in the described manner, for example to a trajectory planning of the automated driving function 12.

FIG. 8 shows in comparable manner how, even in the case of a roadway with no lane marking, individual roads or traffic lanes can be recognized with the aid of a series 92 of similar individual objects 18 in the form of vehicles, if it is recognized for the individual objects 18 by their aggregated object relations 80 regarding for example the relation type "is the successor of" or "is the predecessor of" (object relation 103) and "is the neighbor of" (object relation 104).

Existing sub-functions of an automated driving function, based on recognized object/entity information, thus acquire further objects/entities and their attributes from the fusion. Functions which employ the relational graph furthermore obtain relations and relation attributes. Recognized relations are passed on in the aggregation/fusion to merged objects/entities and possible contradictions between fusion sources are dealt with.

The basic idea enlarges the object detection with additional information on the object relations, which can be determined by reusing learned object features in a real-time system.

The relation graph offers a compact, yet comprehensive representation of how an object is to be interpreted in its context, which simplifies the functions based on implementing this. Further, it allows arranging objects in independent or overlapping groups, so that different semantic connections can be derived for different driving functions. Due to their common purpose, a benefit results in computing expense.

The object relations can be easily tracked together with the corresponding objects, making it possible to pass on context information recognized in the sensor to a time-consistent environment model. Likewise, object relations can be merged, even between different sensor sources. Moreover, thanks to recognizing of relations in individual sensor measurements, there is a latency benefit as compared to the possibility of determining relations in a module or processing unit coming after the tracking.

For static objects, such as occur primarily in electronic maps, the object relations can be determined independently of image processing methods and can be created for example by manual labels and included in the map data. In this way, on the one hand, it is possible to merge map data with the data determined in real time, in order to deduce any information not available due to concealment, and on the other hand the relations from the maps allow an easier matching up of observed objects and map objects, since not only the object but also its relationship can be used for the matching up.

Specific applications which can be realized with the aid of the object relation graphs are the following:

A function for recognizing the situation at approaches to an intersection can be organized such that it can distinguish multiple intersections in the sensor data, in order to provide a description of the following traffic light systems at road forks for the possible directions, for example. The function can put out hypotheses on the number of recommended roads, their possible starting directions, and the states of relevant light signals. For the hypotheses for the roads, relation information between lane boundaries, arrows, and vehicles can be used and the cases can be considered when each of these road indications can or cannot be used in a specific situation (not available, concealed, faded out, not recognized, etc.). Road hypotheses for "discrete" objects, i.e., arrows and vehicles, are constructed through recognized relations. The matching up of possible roads with groups of traffic lights should be done through the relation recognition between the traffic lights and the objects describing a road. The hypothesis as to whether driving is allowed on a recognized road with possible destination direction is formed after an object tracking, in order to aggregate timing information on traffic light states.

A function for constructing hypotheses on road limitations consisting of discrete, similar objects can be provided. These occur for example in construction sites or on country roads and make it possible to perceive the route in event of heavily dirty or snow-covered traffic lanes. The trend of the limitation will be determined via the 3D-positioning of the individual objects by a tracking or an object fusion. The approach using object relations offers the benefit as compared to a description of the trend of the object by a curve that it will function in the same way for very short road sections limited in this way.

On the example of a case where guide beacons serve as the road limitation, these objects as well as their recognized series relations can be used as lane information, without a separate lane marking, for the construction site situation.

A third possible application would be to use the above described method in the context of a crowd sourcing for the generating and/or the updating of maps. Example: a vehicle which is part of a fleet drives through an intersection. Here, the vehicle will calculate, by means of the above described method, an object relation between for example traffic lanes and traffic lights. The vehicle sends these object relation to an external server by means of a Car2X method, for example. A second vehicle then also drives through the intersection and also calculates an object relation and sends this to the server. The server can then match up a "confidence score" with the object relation, being dependent on how many vehicles have reported the object relation. If the confidence score is above a predefined threshold, the object relation can be used in a map (in order to update it, for example).

On the whole, the examples show how the object relations extracted from individual images of an environment camera can be provided as additional input information for an environment observation.

German patent application no. 10 2021 119871.2, filed Jul. 30, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating an automated driving function in a motor vehicle, comprising:
   recognizing, by at least one object classifier of a processor circuit of the motor vehicle, from sensor data of at least one sensor of the motor vehicle, respective individual objects in individual images of an environment of the motor vehicle described by the sensor data;
   outputting, by the at least one object classifier, for each individual image of the individual images, object data indicating at least one recognized object characteristic of at least one of the respective individual objects included in the individual image;
   recognizing, by at least one relational classifier using the object data for at least some of the respective individual objects, for each individual image of the individual images, a respective pairwise object relation between two of the respective individual objects in the individual image based on predetermined relation features of the respective individual objects in the individual image determined from the sensor data;
   outputting, by the at least one relational classifier, for each individual image of the individual images, relational data that describe the respective pairwise object relation between two of the respective individual objects in the individual image;
   aggregating, by an aggregation module, the relational data throughout multiple consecutive individual images to produce aggregation data that describe aggregated object relations; and
   providing, by the aggregation module, the aggregation data to a tracking module for an object tracking and/or to the automated driving function for a trajectory planning,
   wherein the automated driving function comprises a situation recognition for at least one driving situation and the respective driving situation is described as a combination of some of the respective individual objects and aggregated object relations of the some of the respective individual objects, wherein one driving situation which is detected is a route with no road marking, and
   wherein the respective individual objects detected are vehicles traveling on the route in a consecutive series, and the aggregated object relations are used to recognize the consecutive series of consecutively traveling vehicles and a geometrical trend of the consecutive series is signaled as the route.

2. The method according to claim 1, wherein the aggregation module, based on a frequency of repetition and/or quality of a recognition of a particular object relation, determines a weighting value for a particular aggregated object relation and by this describes the aggregation data, and/or the aggregated object relations which produce a closed relational graph of object relations for several of the respective individual objects describe the several of the respective individual objects as a related object group.

3. The method according to claim 1, wherein the at least one relational classifier includes a plurality of relational classifiers, wherein the at least one sensor includes a plurality of sensors, and wherein respective sensor data from the sensors receive respective individual images and for each of the sensors a different one of the relational classifiers operates and the aggregation module performs a relational data fusion for relational data of the relational classifiers.

4. The method according to claim 1, wherein the object classifier uses the object data as respective object characteristics to indicate a bounding box and/or an object type.

5. The method according to claim 1, wherein the aggregation data are used in the tracking module to perform an object tracking of an individual object hidden in at least one individual image of multiple consecutive individual images and/or the relational data are formed in the aggregation module by tracking data from the tracking module throughout multiple consecutive individual images by identifying a hidden individual object through the tracking module.

6. The method according to claim 1, wherein the at least one relational classifier signals, as a pairwise object relation, a relative arrangement of particular ones of the respective individual objects by a directional relation statement, including adjacent, consecutive, predecessor, successor, and/or a nondirectional relation statement.

7. The method according to claim 1, wherein the relational classifier performs a recognition of a particular object relation independently of a following included environment map of the automated driving function and/or without information about planned trajectories of the automated driving function.

8. The method according to claim 1, wherein the driving situation detected is an approaching of an intersection wherein aggregation data on object relations between stationary infrastructure objects, including lane boundaries and/or lane arrows, and/or object relations between infrastructure objects and vehicles and/or object relations between vehicles are combined to form route hypotheses in regard to available routes, wherein possible routes are coordinated with groups of traffic lights through a relation recognition from aggregated object relations between the traffic lights and the respective individual objects describing a route.

9. A method for operating an automated driving function in a motor vehicle, comprising:
   recognizing, by at least one object classifier of a processor circuit of the motor vehicle, from sensor data of at least one sensor of the motor vehicle, respective individual objects in individual images of an environment of the motor vehicle described by the sensor data;

outputting, by the at least one object classifier, for each individual image of the individual images, object data indicating at least one recognized object characteristic of at least one of the respective individual objects included in the individual image;

recognizing, by at least one relational classifier using the object data for at least some of the respective individual objects, for each individual image of the individual images, a respective pairwise object relation between two of the respective individual objects in the individual image based on predetermined relation features of the respective individual objects in the individual image determined from the sensor data;

outputting, by the at least one relational classifier, for each individual image of the individual images, relational data that describe the respective pairwise object relation between two of the respective individual objects in the individual image;

aggregating, by an aggregation module, the relational data throughout multiple consecutive individual images to produce aggregation data that describe aggregated object relations; and providing, by the aggregation module, the aggregation data to a tracking module for an object tracking and/or to the automated driving function for a trajectory planning, wherein one driving situation which is detected is a road boundary formed from discrete, similar ones of the respective individual objects, including in a construction site and/or on a country road, wherein a trend of the road boundary is determined through the aggregated object relations based on one of the aggregated object relations indicating that a particular individual object is located behind a particular predecessor object.

10. The method according to claim 1, wherein the automated driving function comprises an object recognition for at least one predetermined environment object and the at least one predetermined environment object is described as a combination of individual components and their aggregated object relations.

11. A method for operating an automated driving function in a motor vehicle, comprising:

recognizing, by at least one object classifier of a processor circuit of the motor vehicle, from sensor data of at least one sensor of the motor vehicle, respective individual objects in individual images of an environment of the motor vehicle described by the sensor data;

outputting, by the at least one object classifier, for each individual image of the individual images, object data indicating at least one recognized object characteristic of at least one of the respective individual objects included in the individual image;

recognizing, by at least one relational classifier using the object data for at least some of the respective individual objects, for each individual image of the individual images, a respective pairwise object relation between two of the respective individual objects in the individual image based on predetermined relation features of the respective individual objects in the individual image determined from the sensor data;

outputting, by the at least one relational classifier, for each individual image of the individual images, relational data that describe the respective pairwise object relation between two of the respective individual objects in the individual image;

aggregating, by an aggregation module, the relational data throughout multiple consecutive individual images to produce aggregation data that describe aggregated object relations;

providing, by the aggregation module, the aggregation data to a tracking module for an object tracking and/or to the automated driving function for a trajectory planning; and generating and/or updating a digital road map, wherein each of the motor vehicle and at least one further motor vehicle determines aggregation data of aggregated object relations and sends the aggregation data to a vehicle-external server by a predetermined communication method and the vehicle-external server determines a confidence value of each of the aggregated object relations, which is dependent on how many motor vehicles have respectively reported the aggregated object relations, and if the confidence value of a particular object relation is greater than a predefined threshold value, the particular object relation is entered into the digital road map, and/or for an initialization of the aggregation module, initial object relations already present in the digital road map are read out and aggregated with sensor data.

12. A processor circuit for a motor vehicle, comprising:
a processor device; and
a data storage storing program code that, when executed by the processor device, causes the processor circuit to:
  recognize, by at least one object classifier, from sensor data of at least one sensor of the motor vehicle, respective individual objects in individual images of an environment of the motor vehicle described by the sensor data;
  output, by the at least one object classifier, for each individual image of the individual images, object data indicating at least one recognized object characteristic of at least one of the respective individual objects included in the individual image;
  recognize, by at least one relational classifier using the object data for at least some of the respective individual objects, for each individual image of the individual images, a respective pairwise object relation between two of the respective individual objects in the individual image based on predetermined relation features of the respective individual objects in the individual images determined from the sensor data;
  output, by the at least one relational classifier, for each individual image of the individual images, relational data that describe the respective pairwise object relation between two of the respective individual objects in the individual image;
  aggregate, by an aggregation module, the relational data throughout multiple consecutive individual images to produce aggregation data that describe aggregated object relations;
  provide, by the aggregation module, the aggregation data to a tracking module for an object tracking and/or to an automated driving function for a trajectory planning; and
  generate and/or update a digital road map, wherein each of the motor vehicle and at least one further motor vehicle determines aggregation data of aggregated object relations and sends the aggregation data to a vehicle-external server by a predetermined communication method and the vehicle-external server determines a confidence value of each of the aggregated object relations, which is dependent on how many motor vehicles have respectively reported the aggregated object relations, and if the confidence value of a particular object relation is greater than a predefined threshold value, the particular object relation is entered into the digital road map, and/or for an initialization of the aggregation module, initial object relations already present in the digital road map are read out and aggregated with sensor data.

13. A motor vehicle comprising the processor circuit of claim 12.

* * * * *